United States Patent [19]
Yamaguchi et al.

[11] Patent Number: 5,475,445
[45] Date of Patent: Dec. 12, 1995

[54] MOTION ADAPTIVE LUMINANCE SIGNAL AND COLOR SIGNAL SEPARATION FILTER

[75] Inventors: Noriyuki Yamaguchi; Takuji Kurashita; Mitsuru Ishizuka; Junko Taniguchi; Masaharu Yao, all of Nagaokakyo, Japan

[73] Assignee: Mitsubishi Denki Kabushiki Kaisha, Tokyo, Japan

[21] Appl. No.: 279,894

[22] Filed: Jul. 25, 1994

Related U.S. Application Data

[63] Continuation of Ser. No. 973,546, Nov. 9, 1992, abandoned, which is a continuation of Ser. No. 718,212, Jun. 20, 1991, abandoned, which is a continuation-in-part of Ser. No. 676,319, Mar. 28, 1991, abandoned.

[30] Foreign Application Priority Data

Apr. 3, 1990 [JP] Japan ................. 2-89532

[51] Int. Cl.$^6$ ................. H04N 9/78
[52] U.S. Cl. ................. 348/663; 348/665; 348/669
[58] Field of Search ................. 348/663, 665, 348/667, 669, 670; H04N 9/78

[56] References Cited

U.S. PATENT DOCUMENTS

| | | | |
|---|---|---|---|
| 4,597,007 | 6/1986 | Reitmeier et al. | 358/31 |
| 4,636,840 | 1/1987 | McNeely et al. | 358/31 |
| 4,786,963 | 11/1988 | McNeely et al. | 358/31 |
| 4,930,012 | 5/1990 | Fujita | 358/105 |
| 4,994,900 | 2/1991 | Ebara | 358/31 |
| 5,023,713 | 6/1991 | Nishigori | 358/31 |
| 5,023,715 | 6/1991 | Owada | 358/105 |
| 5,051,818 | 9/1991 | Mishima | 358/31 |
| 5,051,826 | 9/1991 | Ishii | 358/105 |

FOREIGN PATENT DOCUMENTS

| | | | |
|---|---|---|---|
| 68792 | 4/1985 | Japan | H04N 9/78 |
| 62292 | 4/1985 | Japan | H04N 9/78 |
| 61-018285 | 1/1986 | Japan | H04N 9/78 |
| 186095 | 8/1986 | Japan | H04N 9/78 |
| 63-124696 | 5/1988 | Japan | H04N 9/78 |
| 63-187894 | 8/1988 | Japan | H04N 9/78 |
| 63-203087 | 8/1988 | Japan | H04N 9/78 |
| 63-200692 | 8/1988 | Japan | H04N 9/78 |
| 0176189 | 7/1989 | Japan | H04N 9/78 |

OTHER PUBLICATIONS

"Development of Improved Three Dimensional Digital Color Decoder for Digital Component System Conforming to CCIR REC–601" ITEJ Technical Report, vol. 12, No. 41, pp. 13–17, TEBS '88–28 (Oct. 1988).

"Cooperative Processing for Improved NTSC Chrominance/Luminance Separation" SMPTE Journal, Aug. 1986.

Achiha et al.; "A Motion–Adaptive High–Definition Converter for NTSC Color TV Signals"; SMPTE Journal, May 1984, pp. 470–478.

Kita et al.; "Three–Dimensional Y/C Separation Filter"; Sony Corporation; pp. 1–13.

Primary Examiner—James J. Groody
Assistant Examiner—Glenton B. Burgess

[57] ABSTRACT

A filter is used for separating luminance and color signals from a composite color television signal in which the frequency of the color signal is multiplexed over the high-frequency region of the luminance signal. When a picture is detected with respect to its motion under frame correlation, and if that motion is relatively small, the separation of luminance and color signals is performed based on interframe correlation. If the motion is relatively large, the separation of luminance and color signals is made based on interfield correlation. The luminance and color signal separation based on the interfield correlation is attained from a correlation with signals in fields spaced forwardly and rearwardly away from the subject field by one field. This is accomplished by selecting a calculation having the highest among a plurality of calculations for an objective sample point and a plurality of sample points located about the objective sample point. Such a correlation is determined by checking the correlation of image signals in the set of sample points which are spaced apart from one another by one frame and located around the objective sample point.

46 Claims, 13 Drawing Sheets

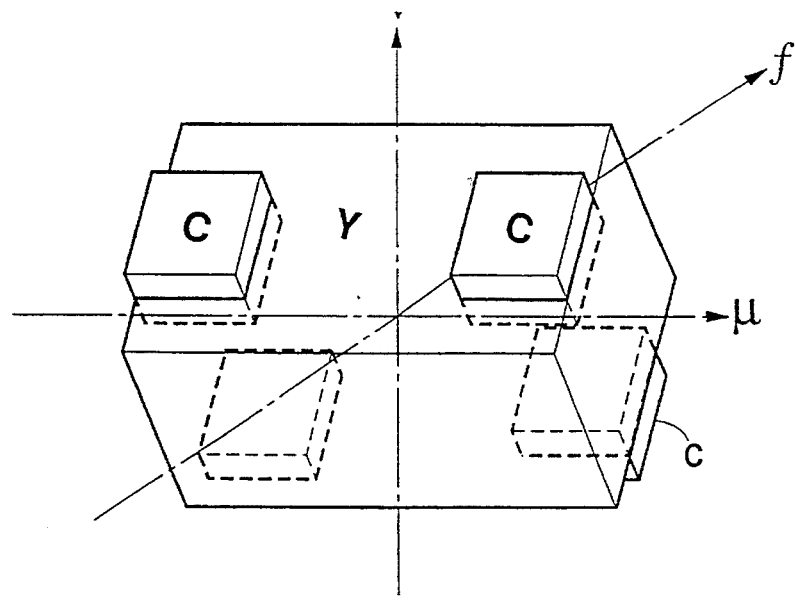
FIG. 6A
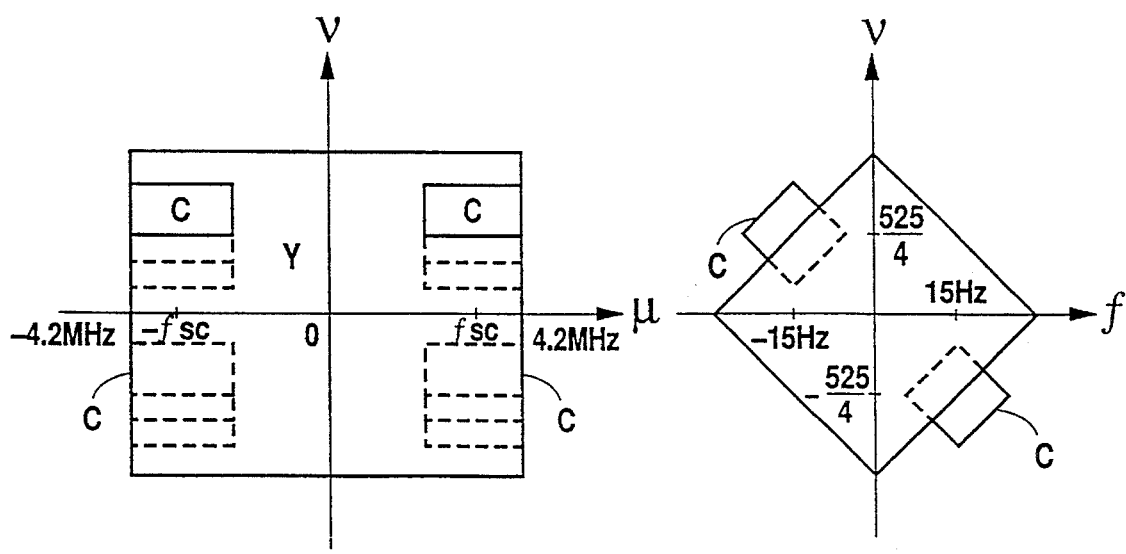
FIG. 6B  FIG. 6C

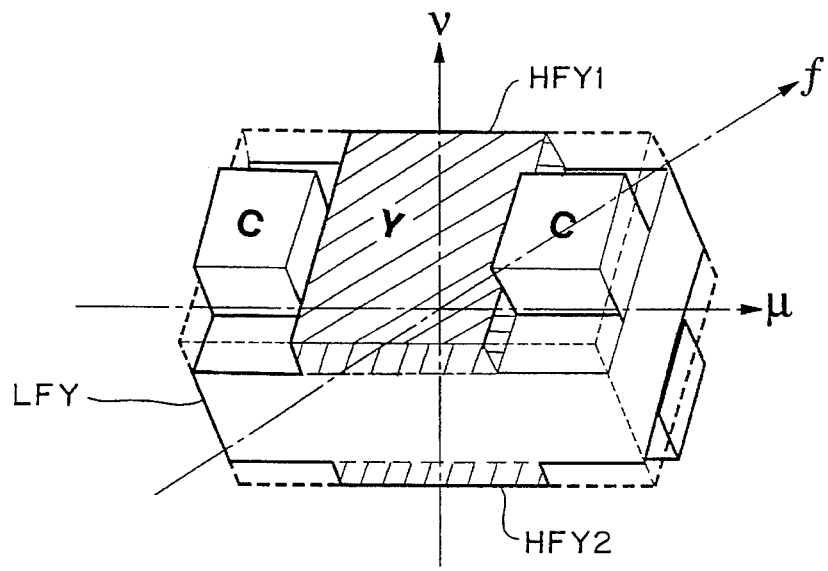
FIG. 7A
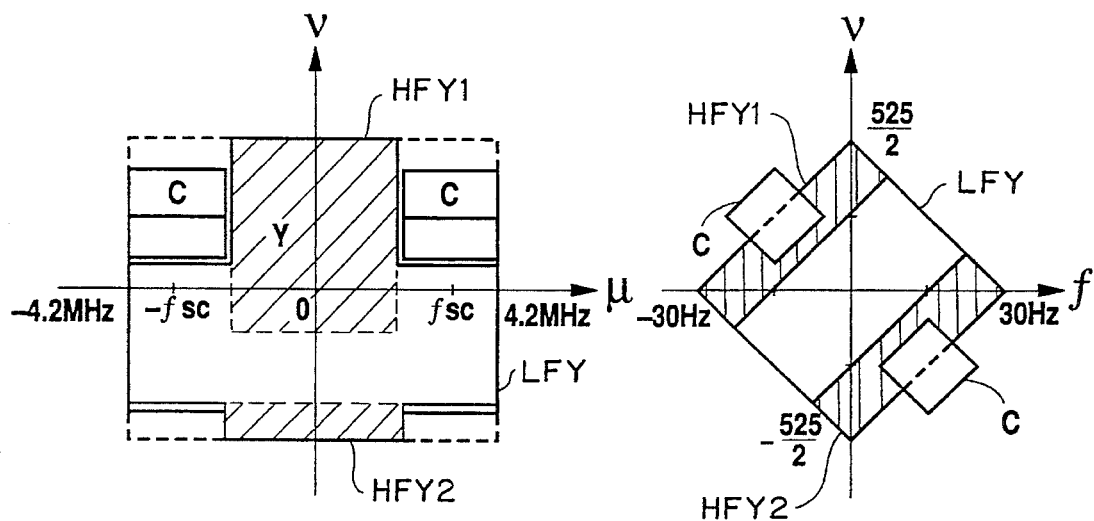
FIG. 7B     FIG. 7C

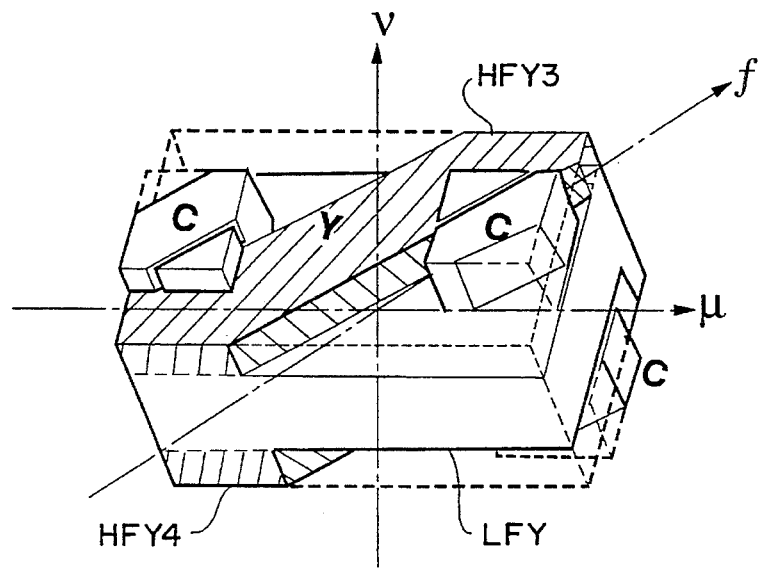
FIG. 9A
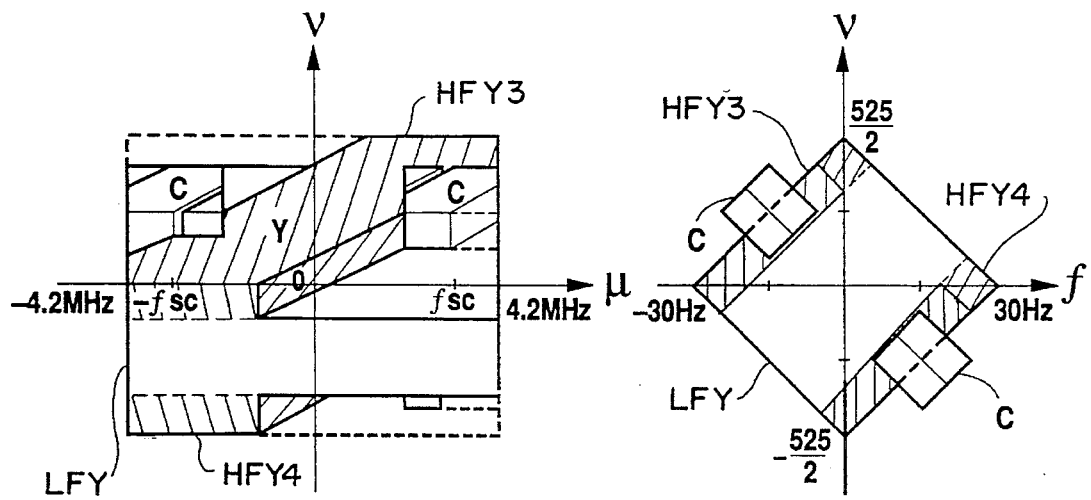
FIG. 9B  FIG. 9C

MOTION ADAPTIVE LUMINANCE SIGNAL AND COLOR SIGNAL SEPARATION FILTER

This application is a continuation of application Ser. No. 07/973,546 filed on Nov. 9, 1992, which is a Rule 62 continuation of Ser. No. 07/718,212, filed Jun. 20, 1991; which is a CIP application of Ser. No. 07/676,319, filed Mar. 28, 1991; all of which are now abandoned.

BACKGROUND OF THE INVENTION

1. Field of the Invention

The present invention relates to a motion adaptive luminance signal and color signal separating filter for separating a luminance signal (hereinafter referred to as "Y signal" or simply "Y") and a color signal (hereinafter referred to as "C signal" or simply "C") from a composite color television signal (hereinafter referred to as "V signal") in which the frequency of the C signal is multiplexed on the high frequency region of the Y signal.

The motion adaptive YC separating filter is a filter which locally judges whether a picture is a still picture or a motion picture and executes YC separation suitable to the pixel signal in that picture, at each of the locations thereof.

2. Description of the Related Art

The current NTSC signal system provides a composite signal comprising a C signal and a Y signal having its high-frequency region on which the frequency of the C signal is multiplexed. Therefore, television sets require YC separation. Imperfect YC separation causes the picture quality to deteriorate in cross color, dot crawl and so on.

With development of large-capacity digital memories, there have been proposed various types of signal processing circuits for improving the quality of picture. For example, one system which includes the use of a motion adaptive YC separation which utilizes a delay circuit having a delay time equal to or greater than the vertical scanning frequency of a television signal.

FIG. 10 is a block diagram showing one example of the conventional motion adaptive YC separating filters. In FIG. 10, the filter receives, at its input terminal 1, a V signal 101 according to the NTSC system. This signal is input to both the respective input terminals of infield YC separation circuit 4, interframe YC separating circuit 5, Y-signal motion detecting circuit 6 and C-signal motion detecting circuit 7.

In the infield YC separating circuit 4, the input signal is infield separated into a Y signal 102 and a C signal 103 through an infield filter (not shown), the Y and C signals then being applied respectively to the first inputs of Y-signal mixing circuit 9 and C-signal mixing circuit 10.

In the interframe YC separating circuit 5, the input signal is interframe separated into a Y signal 104 and a C signal 105. These Y and C signals are then supplied respectively to the second inputs of the Y-signal and C-signal mixing circuits 9 and 10.

On the other hand, a signal 106 indicative of the movement of Y signal detected by the Y-signal motion detecting circuit 6 is applied to one of the inputs of a synthesizer 8 while a signal 107 representative of the movement of C signal detected by the C-signal motion detecting circuit 7 is supplied to the other input of the synthesizer 8.

The synthesizer 8 forms a motion detection signal 108 which is input to the respective third inputs of the Y-signal and C-signal mixing circuits 9 and 10. Thus, the Y-signal motion detecting circuit 6, C-signal motion detecting circuit 7 and synthesizing circuit 8 define a motion detecting circuit 80.

The output 2 of the Y-signal mixing circuit 9 provides a motion adaptive separated Y signal 109 while the output 3 of the C-signal mixing circuit 10 provides a motion adaptive separated C signal 110.

This conventional YC separating circuit will now be described in operation.

On YC separation of V signal 101, the motion detecting circuit 80 judges whether the V signal 101 is one indicative of a still or motion picture, based on the output signal from the synthesizer 8 in which the outputs of the Y-signal and C-signal motion detecting circuits 6 and 7 are synthesized.

As shown in FIG. 11, the Y-signal motion detecting circuit 6 may comprise a one-frame delay circuit 53, a subtracter 54, a low pass filter 55 (hereinafter referred to as "LPF"), an absolute value circuit 56 and a nonlinear converting circuit 57. V signal 101, inputted to the Y-signal motion detecting circuit 6 at its input 51, is delayed by one frame at the one-frame delay circuit 53. The V signal 101 is also applied directly to the subtracter 54 and then subtracted from the one-frame delayed signal to determine one-frame difference therebetween. The one-frame difference signal is passed through the low pass filter 55 (hereinafter referred to as "LPF") and then applied to the absolute value circuit 56 whereat the absolute value thereof is determined. The determined absolute value is then converted by the nonlinear converting circuit 57 into a signal 106 indicative of the amount of movement of the low frequency component in the Y signal. This signal 106 is outputted from the output 52 of the Y-signal detecting circuit 6. The nonlinear converting circuit 57 serves to convert an absolute value into data having a magnitude which can be more easily handled by the system.

As shown in FIG. 12, the C-signal motion detecting circuit 7 may comprise a two-frame delay circuit 81, a subtracter 82, a band pass filter 83 (hereinafter referred to as "BPF"), an absolute value circuit 84 and a nonlinear converting circuit 85. V signal 101 inputted to the C-signal motion detecting circuit 7 at its input 11 is delayed by one frame at the two-frame delay circuit 81. The V signal 101 is also applied directly to the subtracter 82 and then subtracted from the two-frame delayed signal to determine two-frame difference therebetween. The two-frame difference signal is passed through the band pass filter 83 and then applied to the absolute value circuit 84 whereat the absolute value thereof is determined. The determined absolute value is then converted by the nonlinear converting circuit 85 into a signal 107 indicative of the amount of movement in the C signal. This signal 107 is outputted from the output 89 of the C-signal detecting circuit 7.

The synthesizing circuit 8 is adapted to select and output one of the Y-signal and C-signal movement signals 106 and 107, which is larger than the other movement.

Such a judgement is represented by a control signal 108 in the form of motion coefficient ($0 \leq k \leq 1$). If a picture is judged to be a complete still picture, the motion coefficient k is equal to zero. If the picture is judged to be a complete motion picture, the motion coefficient k is equal to one.

Generally, if a picture is a still picture, the interframe correlation is utilized to perform the interframe YC separation such that Y and C signals are separated from each other.

As shown in FIG. 13, the interframe YC separating circuit 5 may comprise a one-frame delay circuit 64, an adder 65 and a subtracter 66. V signal 101, inputted to the interframe YC separating circuit 5 at its input 61, is delayed by one frame at the one-frame delay circuit 64 to form a one-frame delay signal which in turn is added to the V signal directly inputted to the adder 65. The resultant one-frame sum provides a YF signal 104 which is outputted from one output 62 in the interframe YC separating circuit 5. At the same time, the subtracter 66 subtracts the YF signal 104 from the V signal 101 directly applied from the input 61 to the subtracter 66 to extract a CF signal 105 which in turn is outputted from the output 63 of the interframe YC separating circuit 5.

In general, if a picture is a motion picture, the infield correlation is utilized to perform the infield YC separation such that the Y and C signals are separated from each other.

As shown in FIG. 14, the infield YC separating circuit 4 may comprise a one-line delay (one horizontal line . . . 1 H delay) circuit 74, an adder 75 and a subtracter 76. V signal 101 inputted to the infield YC separating circuit 4 at its input 71 is delayed by one line at the one-line delay circuit 74 to form a one-line delay signal which in turn is added to the V signal directly inputted to the adder 75. The resultant one-line sum provides a Yf signal 102 which is outputted from one output 72 in the infield YC separating circuit 5. At the same time, the subtracter 76 subtracts the Yf signal 104 from the V signal 101 directly applied from the input 71 to the subtracter 76, to extract a Cf signal 103 which in turn is outputted from the output 73 of the infield YC separating circuit 4.

Since the infield and interframe YC separating circuits 4 and 5 are arranged parallel to each other, the motion adaptive YC separation filter can cause the Y-signal mixing circuit 9 to calculate the following equation using the motion coefficient k synthesized by the synthesizer 8:

$$Y = kYf + (1-k)YF$$

where Yf is an output Y signal 102 from the infield YC separation and YF is an output Y signal 104 from the interframe YC separation. There is thus obtained a motion adaptive YC separation Y signal 109 which in turn is outputted from the motion adaptive YC separation filter at the output 2.

Similarly, the control signal 108 is utilized to cause the C-signal mixing circuit 10 to calculate the following equation:

$$C = kCf + (1-k)CF$$

where Cf is an output signal 103 from the infield YC separation and CF is an output signal 105 from the interframe YC separation. There is thus obtained a motion adaptive YC separation C signal 110 which in turn is outputted from the output 3.

The C-signal motion detecting circuit 7 may be arranged as shown in FIG. 15. In this figure, V signal 101 inputted to the circuit 7 at the input 11 is demodulated by a color demodulating circuit 86 into two color difference signals R-Y and B-Y. These color difference signals R-Y and B-Y are then applied to a time division multiplexer 87 in which they are time-division multiplexed at a certain frequency. The output signal from the time division multiplexer 87 is then subjected to subtraction from an output signal from a two-frame delay circuit 81. There is thus obtained a two-frame difference signal.

The two-frame difference signal is passed through LPF 88 wherein a Y-signal component is removed therefrom. The output signal of the LPF 88 is then applied to an absolute value circuit 84 to extract an absolute value therefrom. The absolute value is then applied to a nonlinear converter 85 wherein it is nonlinearly converted into a C-signal motion detection signal 107 which in turn is outputted from the output 89 of the C-signal motion detecting circuit 7.

It will be apparent from the foregoing that Yf and Cf signals from the infield YC separating circuit 4 and YF and CF signals from the interframe YC separating circuit 5 are respectively mixed with each other, based on the amount of movement which is obtained by synthesizing the motion signals from the respective Y-signal and C-signal motion detecting circuits 6 and 7.

Therefore, the filter characteristics for the still picture will be completely different from that for the motion picture. If a picture is switched from a still to a motion picture or vice versa, the resolution is subjected to severe change such that the quality of picture will be remarkably degraded upon processing of the motion picture.

SUMMARY OF THE INVENTION

In order to overcome the above problem in the prior art, it is therefore an object of the present invention to provide a motion adaptive YC separation filter which can reproduce even such a multi-switched picture as described above with an increased resolution and with a reduced degradation of image quality.

To this end, the present invention provides a motion adaptive YC separation filter comprising YC separation in three fields circuit means which can provide Y and C signals from the YC separation in three fields by locally detecting the correlation between frames when a motion picture is detected by a motion detecting circuit. The detected results are then used to perform the adaptive selection of plural interfield processing operations including calculations in three fields.

If a motion picture is detected by the motion detecting circuit, the motion adaptive YC separating filter of the present invention detects the correlation between the frames. The motion adaptive YC separating filter includes three YC separating in three fields circuits. One of those depending on the magnitude of the detected correlation, is selected to provide Y and C signals from the YC separation in three field.

In accordance with the present invention, the motion adaptive YC separating filter comprises YC separation in three fields circuit means which includes YC separating in three fields filters performing luminance signal band limitations from three different three-interfield calculations. This is achieved by detecting the local interframe correlation when a motion picture is detected by the motion detecting circuit or four different YC separating in three fields filters including luminance signal band limitations from infield calculations. These filters are adaptively selected by detecting the local interframe correlation when a motion picture is detected by the motion detecting circuit. Therefore, the optimum YC separation can be carried out by utilizing the correlations in the motion picture to process it without degradation of resolution.

In accordance with the present invention, moreover, the motion adaptive YC separating filter comprises YC separation in three fields circuit means which includes YC separating in three fields filters performing color signal band limitations from three different calculations in three fields. This is achieved by detecting the local interframe correlation when a motion picture is detected by the motion detecting circuit or four different YC separating in three fields filters including color signal band limitations from infield calculations. There filters are adaptively selected by detecting the local interframe correlation when a motion picture is detected by the motion detecting circuit. Therefore, the optimum YC separation can be carried out by utilizing the correlation in the motion picture to process it without degradation of resolution.

BRIEF DESCRIPTION OF THE DRAWINGS

FIG. 6A is an oblique view of the spectrum distribution of the V signal in a three-dimensional frequency space.

FIG. 6B is a view of the spectrum distribution of FIG. 6A as viewed along the f-axis from the negative side.

FIG. 6C is a view of the spectrum distribution of FIG. 6A as viewed along the µ -axis from the positive side.

FIG. 7A is an oblique view of the spectrum distribution of Y and C signals obtained from the first YC separation in three fields according to the present invention in a three-dimensional frequency space.

FIG. 7B is a view of the spectrum distribution of FIG. 7A as viewed along the f-axis from the negative side.

FIG. 7C is a view of the spectrum distribution of FIG. 7A as viewed along the µ-axis from the positive side.

FIG. 9A is an oblique view of the spectrum distribution of Y and C signals obtained from the third YC separation in three fields according to the present invention in a three-dimensional frequency space.

FIG. 9B is a view of the spectrum distribution of FIG. 9A as viewed along the f-axis from the negative side.

FIG. 9C is a view of the spectrum distribution of FIG. 9A as viewed along the µ-axis from the positive side.

DETAILED DESCRIPTION OF PREFERRED EMBODIMENTS

The present invention will now be described by way of example with reference to the drawings.

Figure 1:
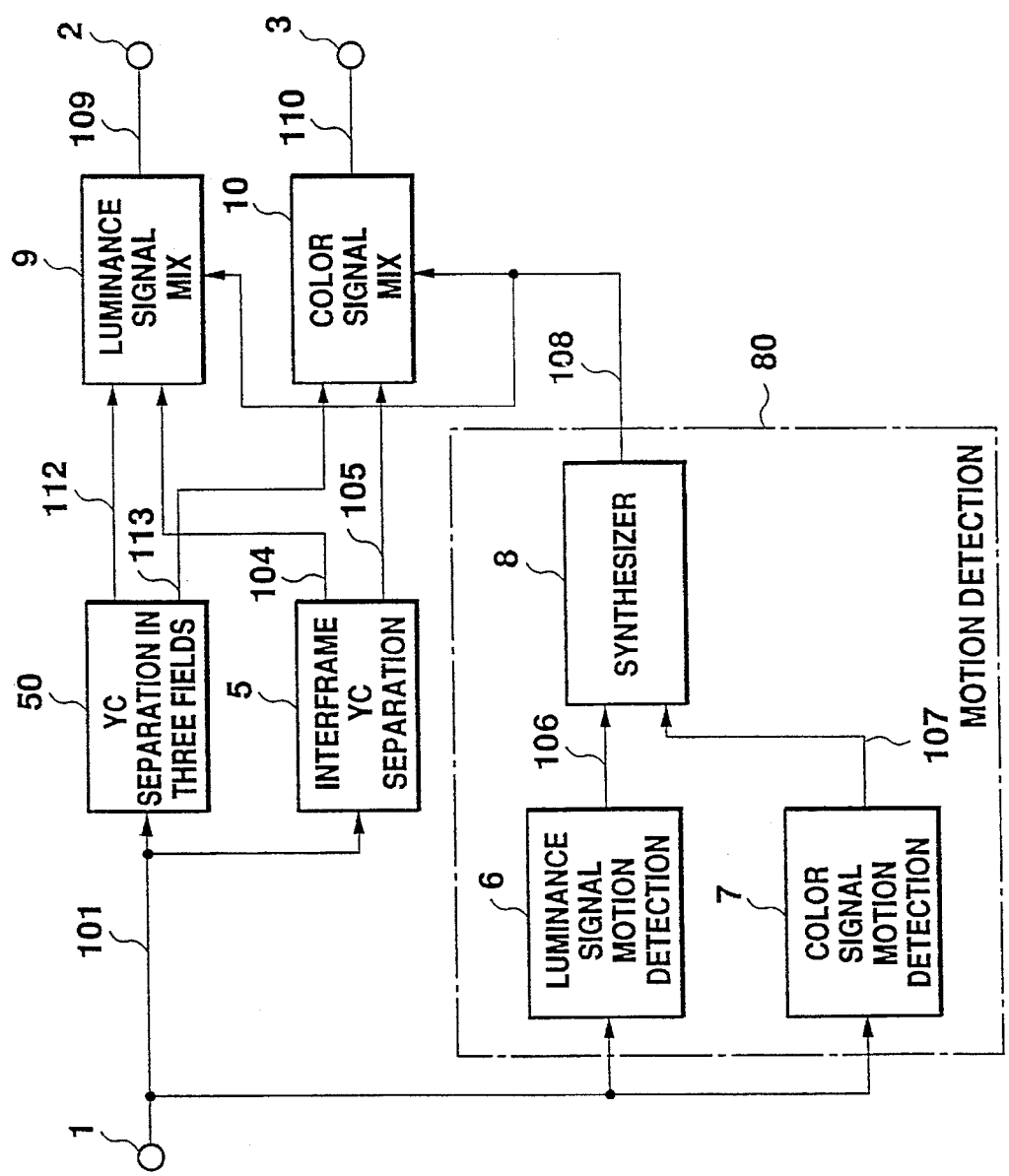
FIG. 1 is a block diagram of one embodiment of a motion adaptive YC separating filter constructed in accordance with the present invention.
Figure 10:
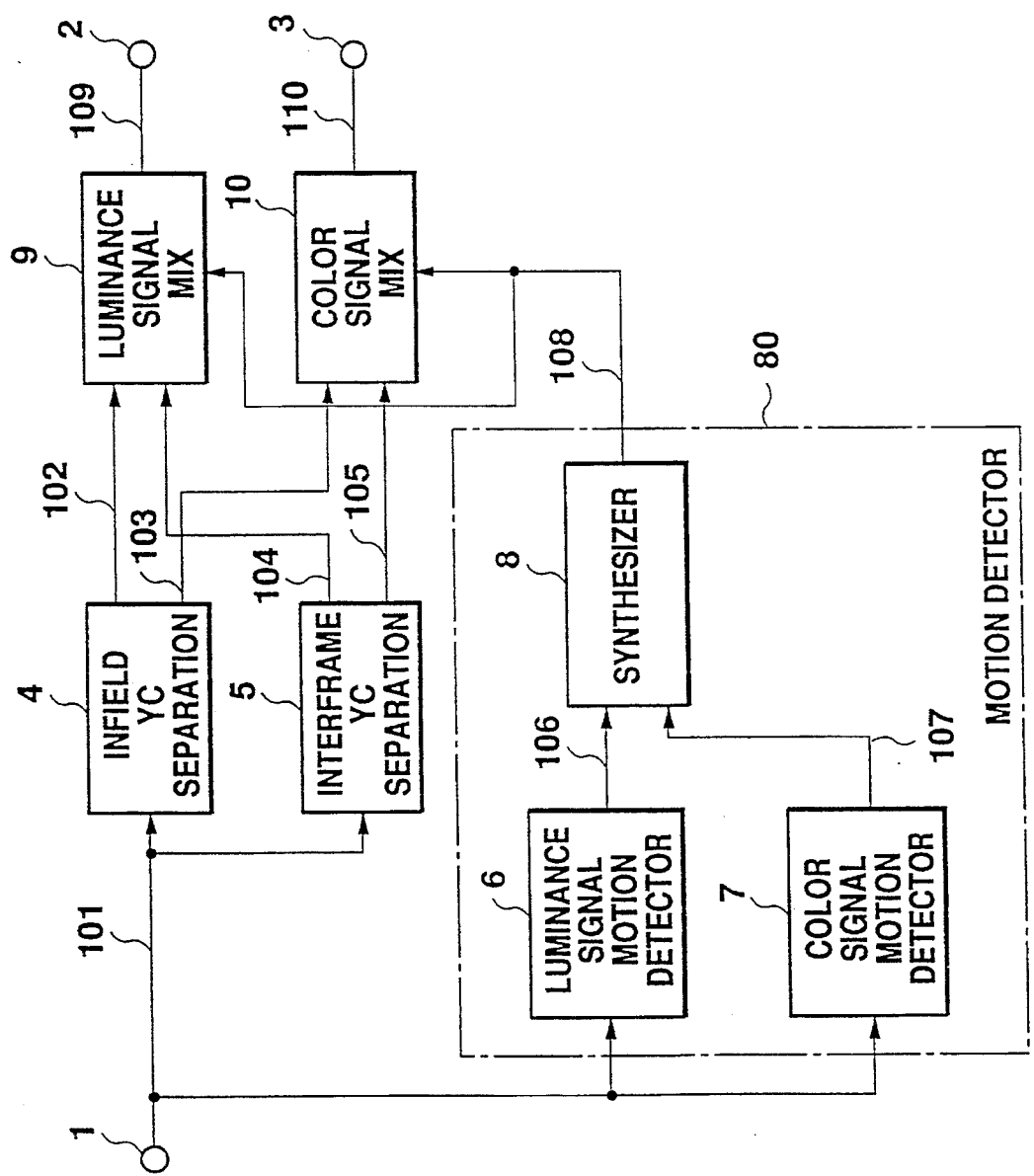
FIG. 10 is a block diagram of a conventional motion adaptive YC separation filter.
Figure 11:
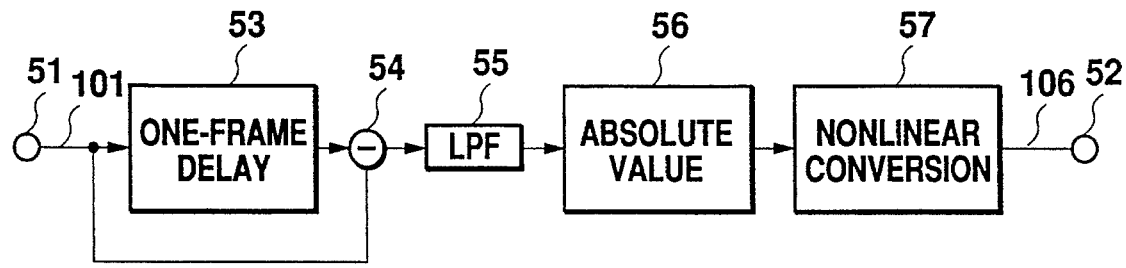
FIG. 11 is a block diagram of the details of a Y-signal motion detecting circuit in the conventional motion adaptive YC separation filter shown in FIG. 10.
Figure 12:
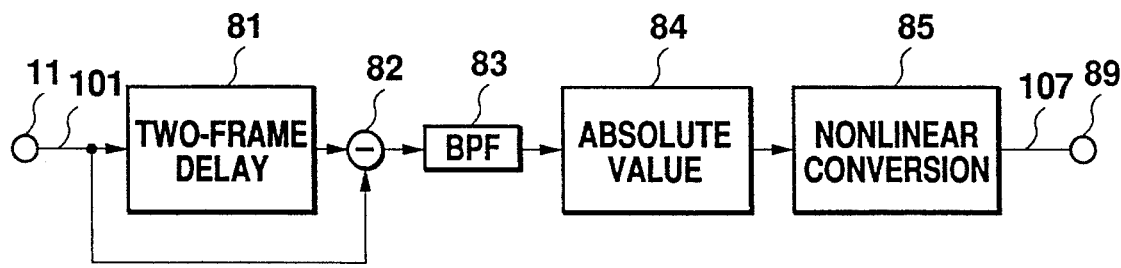
FIG. 12 is a block diagram of the details of a C-signal motion detecting circuit in the conventional motion adaptive YC separation filter shown in FIG. 10.
Figure 13:
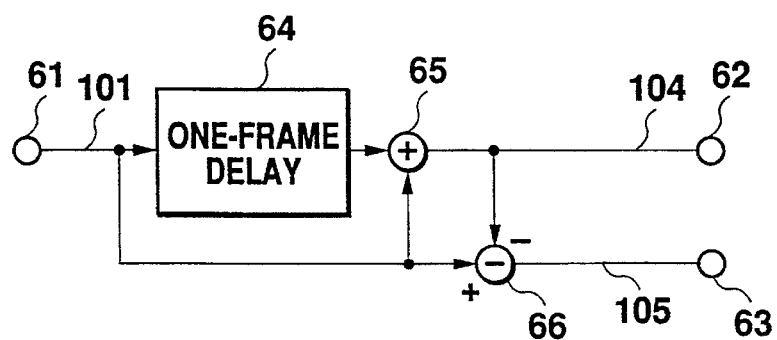
FIG. 13 is a block diagram of the details of an interframe YC separating circuit in the conventional motion adaptive YC separation filter shown in FIG. 10.
Figure 14:
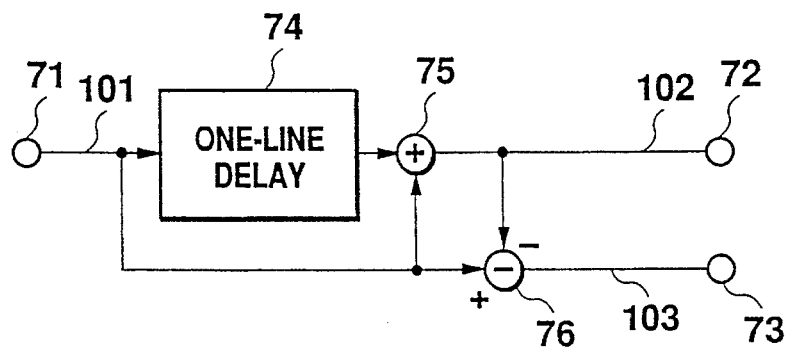
FIG. 14 is a block diagram of the details of an infield YC separating circuit in the conventional motion adaptive YC separation filter shown in FIG. 10.
Figure 15:
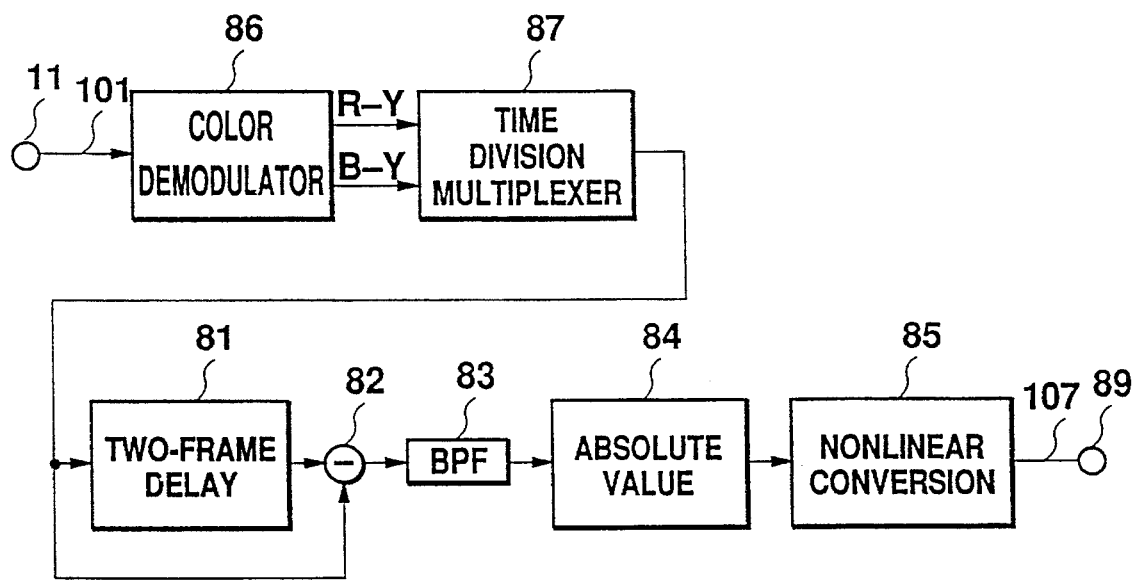
FIG. 15 is a block diagram illustrating another example of the conventional C-signal motion detecting circuits.

FIG. 1 shows a block diagram of one embodiment of a motion adaptive luminance and color signal separating filter constructed in accordance with the present invention. The arrangement shown in FIG. 1 is distinguished from that of FIG. 10 only in that the infield YC separating circuit 4 is replaced by a YC separating in three fields circuit 50. Therefore, the remaining common parts will not be further described herein.

Figure 2:
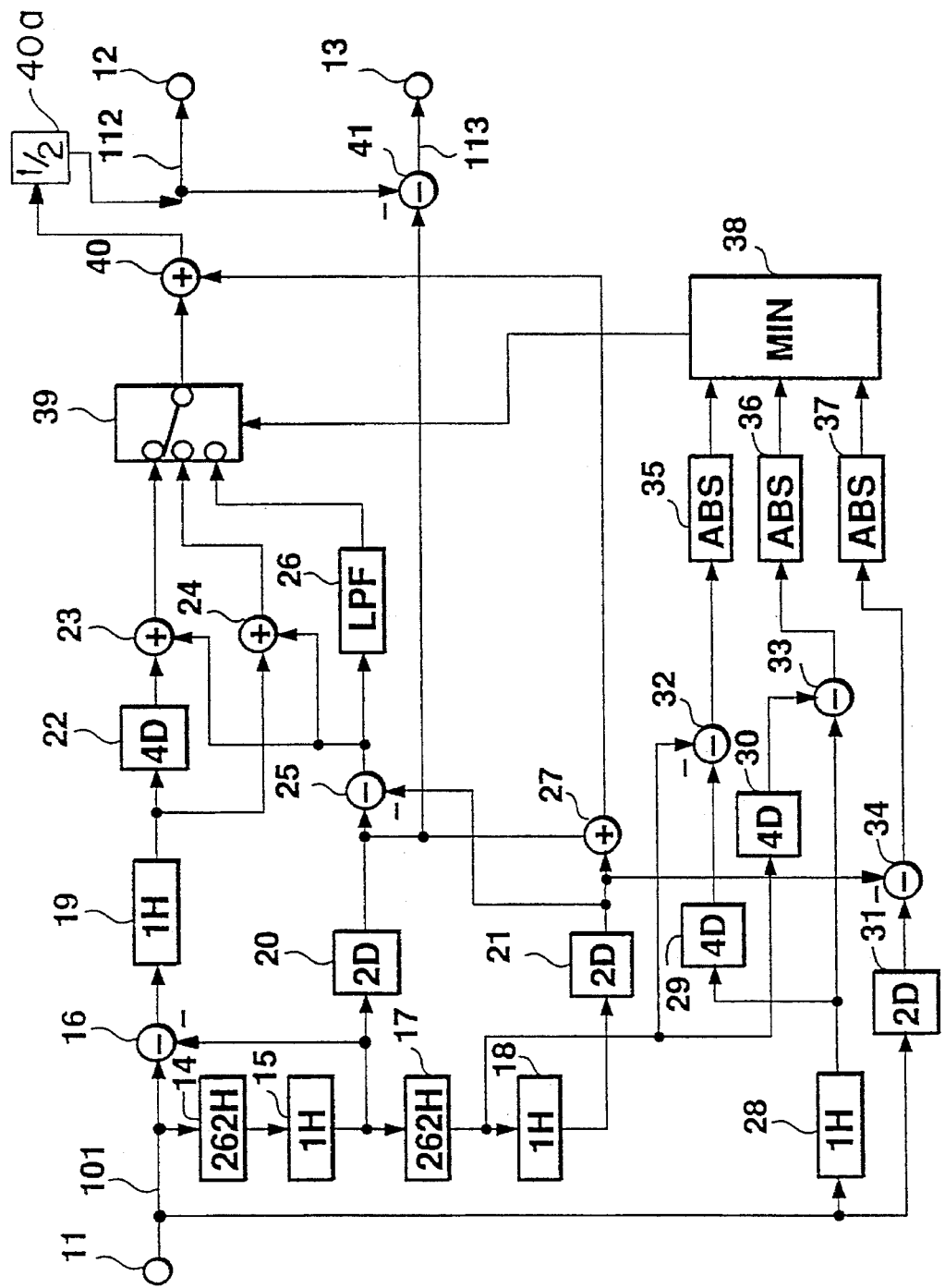
FIG. 2 is a block diagram of the details of a YC separating in three fields circuit used in the embodiment of the present invention shown in FIG. 1.

The details of the YC separating in three fields circuit 50 shown in FIG. 1 is illustrated in FIG. 2 by a block diagram.

Referring now to FIG. 2, the filter receives, at its input from one input terminal 11, a V signal 101. This signal in turn is applied to the inputs of a 262-line (262H) delay circuit 14, one-line (1H) delay circuit 28 and two-pixel (2D) delay circuit 31 and the first input of a subtracter 16.

The V signal is delayed by 262 lines at the 262H delay is then provided to the input of a one-line (1H) delay circuit 15. After being delayed by one line, the V signal is applied to the inputs of a 262-line (262H) delay circuit 17 and two-pixel (2D) delay circuit 20 and the second input of the subtracter 16. After being delayed by 262 lines at the 262H delay circuit 17, the V signal is provided to the inputs of a one-line (1H) delay circuit 18 and four-pixel (4D) delay circuit 30 and the first input of a subtracter 32. After being delayed by one line at the 1H delay circuit 18, the V signal is applied to the input of a two-pixel (2D) delay circuit 21.

The output of the subtracter 16 is applied to the input of one-line (1H) delay circuit 19, the output of which in turn is provided to the input of four-pixel (4D) delay circuit 22 and the first input of an adder 24. The output of the 4D delay circuit 22 is applied to the first input of an adder 23.

After being delayed by two pixels at the 2D delay circuit 20, the V signal is provided to the respective first inputs of subtracter 25, adder 27 and subtracter 41. The output of the 2D delay circuit 21 is applied to the second inputs of the subtracter 25 and adder 27 and the first input of a subtracter 34. The output of the subtracter 25 is provided to the second inputs of adders 23 and 24 and the input of an LPF 26. The output of the adder 27 is applied to the first input of an adder 40.

The output signal of the adder 23 is applied to the first input of a signal selection circuit 39. The output signal of the adder 24 is provided to the second input of the signal selection circuit 39. The output signal of the LPF 26 is supplied to the third input of the signal selection circuit 39.

After being delayed by one line at the 1H delay circuit 28, the V signal is applied to the input of a four-pixel (4D) delay circuit 29 and the first input of a subtracter 33. After being delayed by four pixels at the 4D delay circuit 29, the V signal is provided to the second input of the subtracter 32. After being delayed by four pixels at a four-pixel (4D) delay circuit 30, the V signal is provided to the second input of a subtracter 33. After being delayed by two pixels at the 2D delay circuit 31, the V signal is applied to the second input of a subtracter 34.

The output of the subtracter 32 is applied to the input of an absolute value (ABS) circuit 35; the output of the subtracter 33 to the input of an ABS circuit 36; and the output of the subtracter 34 to the input of an ABS circuit 37.

The output of the ABS circuit 35 is provided to the first input of a minimum value selection circuit 38; the output of the ABS circuit 36 is provided to a one-half multiplier circuit 40a and then to the second input of the minimum value selection circuit 38; and the output of the ABS circuit 37 is provided to the third input of the minimum value selection circuit 38.

The output of the minimum value selection circuit 38 is applied to the fourth input of the signal selection circuit 39, thereby selecting and controlling the first to third inputs of the same circuit 39.

The output of the signal selection circuit 39 is applied to the second input of an adder 40, the output of which is provided to the second input of a subtracter 41 and also outputted through an output terminal 12 as a Y signal 112 from the YC separation in three fields.

The operation will be described below:

Assuming that a scene includes a horizontal x-axis, a vertical y-axis extending perpendicular to the x-axis in the same scene and a time t-axis extending perpendicular to a plane defined by the x- and y-axes, it can be established that a space defined by the three x-, y- and t-axes is a three-dimensional time space.

Figure 5B:
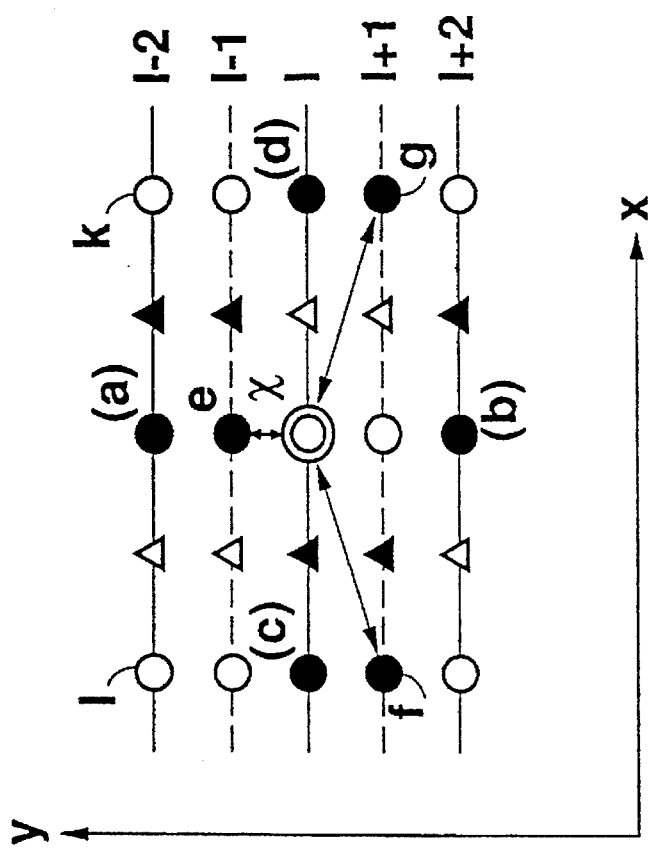
FIGS. 5B and 5C are plan views illustrating the arrangement of the same V signal represented by the use of x-axis and y-axis.
Figure 5A:
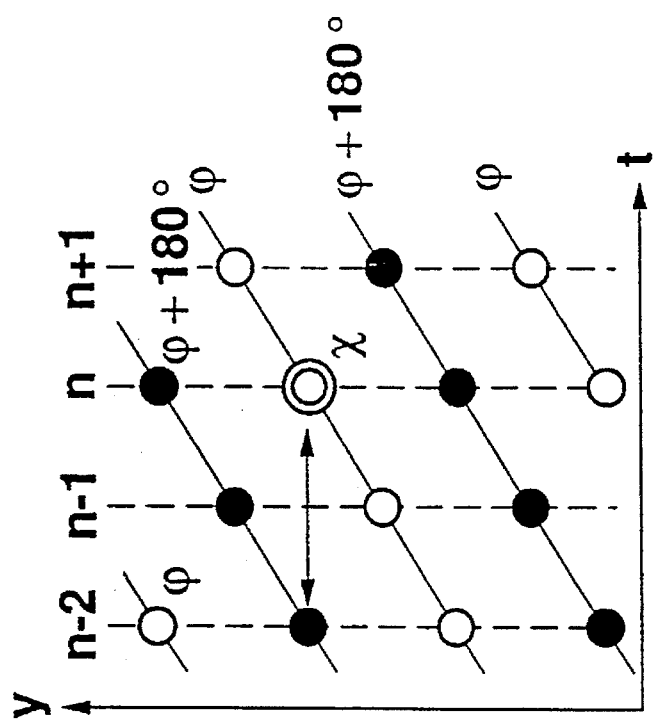
FIG. 5A is a plan view illustrating the arrangement of a V signal represented by the use of t-axis and y-axis, the V signal being digitized at a frequency four times as high as that of a chrominance subcarrier in a three-dimensional time space.
Figure 5C:
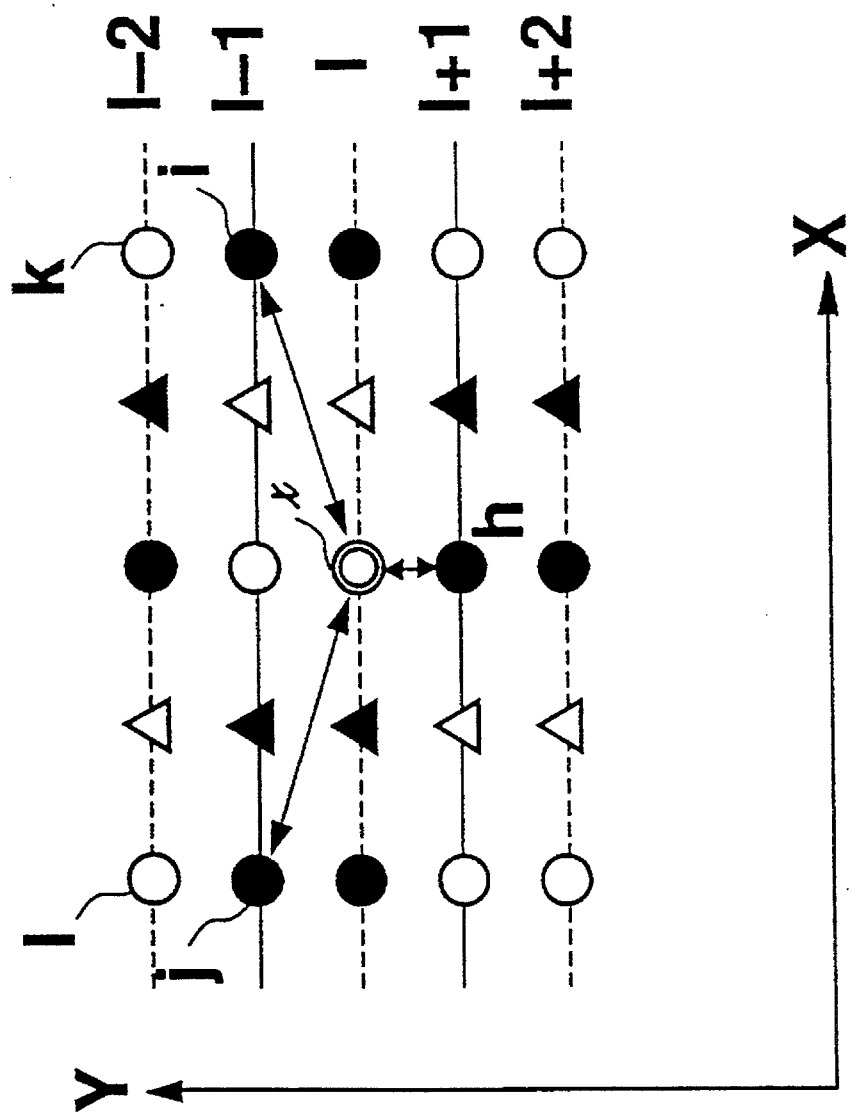

FIG. 5 shows such a three-dimensional time space. FIG. 5A shows a plane defined by the t- and y-axes while FIGS. 5B and 5C show a plane defined by the x- and y-axes. FIG. 5A also shows interlacing scan lines with a broken line illustrating one field. Solid lines depict that chrominance subcarriers are in phase.

In FIG. 5B, solid and broken lines represent scan lines in n and (n−1) fields, respectively. Four marks "o", "●", "∆" and "▲" on each scan line represent sample points at which chrominance subcarriers are in phase when the V signal is digitized with a sampling frequency four times as high as the frequency fsc (=3.58 MHz) of the chrominance subcarrier.

In FIG. 5C, solid and broken lines represent scan lines in (n+1) and n fields, respectively. Four marks "o", "●", "∆" and "▲" on each scan line are similar to those of FIG. B. The sample points "o", "∆", "●", and "▲" have chrominance subcarriers which are out of phase by each 90° in such an order as described.

If it is assumed that an objective sample point is represented by a mark "⊙", the chrominance subcarriers are out of phase by 180° at four points a, b, c and d, which are at the respective second sample points measured forward and backward from the objective sample point "⊙" and on the respective first scan line spaced vertically away from the scan line of the objective sample point in the same field.

Therefore, there can be constructed a comb line filter comprising a digital circuit, an adapted YC separation filter as disclosed in Japanese Patent Laid-Open No. 58-242367 and so on.

Since the chrominance subcarriers are out of phase by 180° at the identical sample points spaced away from each other by one frame as shown in FIG. 5A, the present invention can provide an inframe YC separating filter.

As can be seen from FIG. 5B, the phase of the chrominance subcarrier is reversed in (n−1) field spaced by one field forwardly apart from an objective sample point at a sample point on a line immediately above the scan line on which the objective sample point is located or at two sample points on a line immediately below that scan line. Therefore, interfield YC separation can be made from an arithmetic operation between any one of these three points e, f and g and the objective point $\chi$.

As can be seen from FIG. 5C, the phase of the chrominance subcarrier is reversed in (n+1) field spaced by one field backwardly apart from an objective sample point at a sample point h on a line immediately above the scan line on which the objective sample point is located or at two sample points i and j on a line immediately below that scan line. Therefore, interfield YC separation can be made from an arithmetic operation between any one of these three points h, i and j and the objective point $\chi$.

If it is assumed that a horizontal frequency axis corresponding to the x-axis is μ-axis, a vertical frequency axis corresponding to the y-axis is ν-axis and a time frequency axis corresponding to the t-axis is f-axis, it can be established that there is a three-dimensional frequency space defined by these μ-, ν - and f-axes perpendicular to each other.

FIG. 6 depicts such a three-dimensional frequency space in projection. FIG. 6A is an oblique view of the three-dimensional frequency space; FIG. 6B is a view of the three-dimensional frequency space as viewed along the f-axis from the negative side; and FIG. 6C is a view of the three-dimensional frequency space as viewed along the μ-axis from the positive side.

FIGS. 6A, 6B and 6C represent the spectrum distribution of a V signal in the three-dimensional frequency space. As seen from these figures, the spectrum of Y signal extends around the origin of the three-dimensional frequency space. C signal has four spectrums located in the three-dimensional frequency space at four points as shown in FIGS. 6A to 6C since I and Q signals are modulated into two orthogonal phases at the frequency fsc of the chrominance subcarrier.

If the V signal is observed on the μ-axis as shown in FIG. 6C, however, the spectrums of the C signal will be only on the second and fourth quadrants.

This corresponds to the fact that solid lines representing the in-phase state of the chrominance subcarrier extend upwardly with the passage of time as shown in FIG. 5A.

The conventional motion adaptive YC separating filters performed YC separation by the use of infield correlation when a motion picture was detected. Although the conventional filters could carry out the band limitations in the directions of μ-axis and ν-axis, they could not take the band limitation in the direction of f-axis. This would cause a frequency space originally including Y signal to be separated as C signal, so that the band of Y signal in the motion picture would be decreased.

If the YC separation is made according to the aforementioned interfield processing operation, the band of Y signal in the motion picture can be increased.

Referring again to FIG. 5B, the (n−1) field includes three sample points "●" e, f and g which are near the objective sample point "⊙" $\chi$ and have chrominance subcarriers angularly spaced away from one another by 180°. Referring again to FIG. 5C, the (n+1) field includes three sample points " ● " h, i and j which are near the objective sample point "⊚" χ and have chrominance subcarriers angularly spaced away from one another by 180°. Calculation for any one of the six sample points permits the three-interfield YC separation.

First of all, a low frequency component in the three-dimensional frequency space which is part of Y signal can be taken out from the sum of the objective sample point "⊚" χ with the sample point "●" e in FIG. 5B. Moreover, a high-frequency component in the three-dimensional frequency space which includes C signals can be taken out from the difference between the objective sample point χ and the sample point e. The C signals may be removed from the high-frequency component when the latter is passed through the LPF. The addition of these outputs provides a Y signal. The subtraction of the Y signal from the V signal provides C signals. This is referred to as "the first YC separation in three field".

FIGS. 7A, 7B and 7C are respectively similar to FIGS. 6A, 6B and 6C and illustrate a three-dimensional frequency space including the Y and C signals which have been obtained from the first YC separation in three fields.

A sample point "o" k is now considered which is in the same positional relation as that of the objective sample point χ with the sample point e relative to the sample point i in FIGS. 5B and 5C. Secondly, when the difference between the sample points i and k is added to the difference between the objective sample point χ and the sample point 2, C signals can be removed from the high-frequency component in the three-dimensional frequency space. When this high-frequency component is summed with the low-frequency component in the three-dimensional frequency space which is part of the Y signal obtained from the sum of the objective sample point χ with the sample point e, Y signal can be obtained. The subtraction of the Y signal from the V signal provides C signals. This is referred to as "the second YC separation in three fields".

Figure 8A:
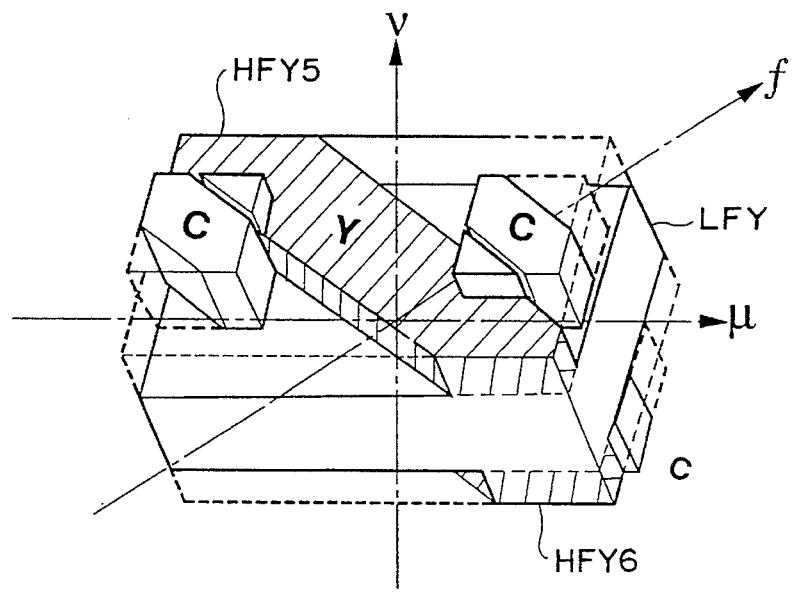
FIG. 8A is an oblique view of the spectrum distribution of Y and C signals obtained from the second YC separation in three fields according to the present invention in a three-dimensional frequency space.
Figure 8B:
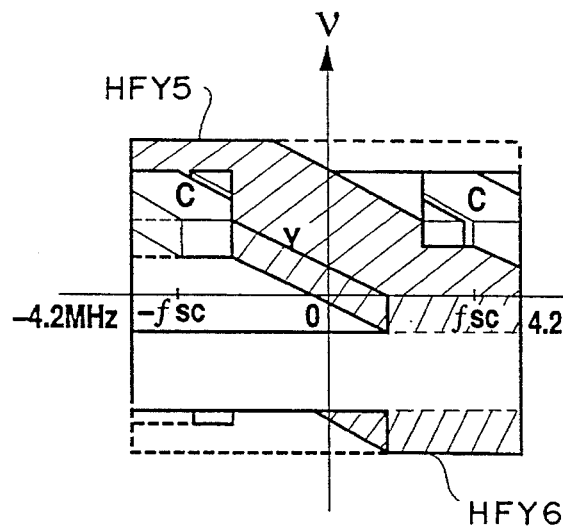
FIG. 8B is a view of the spectrum distribution of FIG. 8A as viewed along the f-axis from the negative side.
Figure 8C:
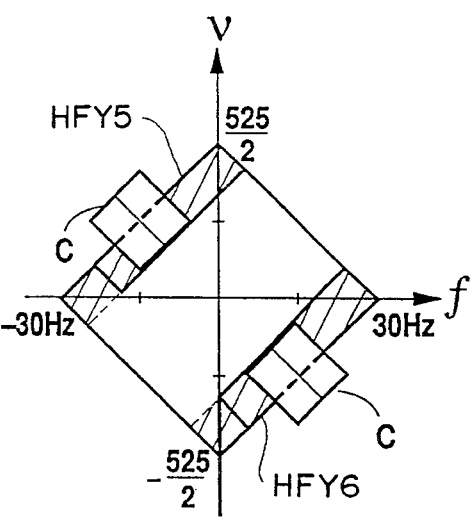
FIG. 8C is a view of the spectrum distribution of FIG. 8A as viewed along the µ -axis from the positive side.

FIGS. 8A, 8B and 8C similarly illustrate a three-dimensional frequency space including Y and C signals which have been obtained from the second YC separation in three fields. It appears from these figures that the C signals are partially included within the separated Y signal. However, there is an extremely small possibility that the C signals are contained in a Y signal, since the great correlation exists between the Y and C signals.

A sample point "o" l is now considered which is in the same positional relation as that of the objective sample point χ with the sample point e relative to the sample point j in FIGS. 5B and 5C. Thirdly, when the difference between the sample points j and l is added to the difference between the objective sample point χ and the sample point e, C signals can be removed from the high-frequency component in the three-dimensional frequency space. When this high-frequency component is summed with the low-frequency component in the three-dimensional frequency space which is part of the Y signal obtained from the sum of the objective sample point χ with the sample point e, Y signal can be obtained. The subtraction of the Y signal from the V signal provides C signals. This is referred to as "the third YC separation in three fields".

FIGS. 9A, 9B and 9C similarly illustrate a three-dimensional frequency space including Y and C signals which have been obtained from the third YC separation in three fields. It appears from these figures that the C signals are partially included within the separated Y signal. However, there is an extremely small possibility that the C signals are contained in the Y signal, for the same reason as in FIG. 8.

In order to adaptively control switching one of the three, first, second and third interfield YC separations, it is required that correlations in the picture are detected in the directions of connection between the objective sample point "⊚" χ and the respective one of the sample points "●" e, f, and g. The correlations of the picture in the respective directions may be detected by calculating the sample points "●" e, f and g in the (n−1) field and the sample points "●" h, i and j in the (n+1) field, the objective sample point "⊚" χ being located between the (n−1) and (n+1) fields. In such a manner, control signals can be obtained.

The inframe YC separation circuit shown in FIG. 2 will be described in operation below:

The present invention is characterized by, when a motion picture is detected by the motion detecting circuit 80, the motion picture is processed by the optimum selected one of the inframe YC separations including the aforementioned first, second and third calculations in three fields, in place of the infield YC separation.

Referring now to FIG. 2, it is assumed herein that V signal 101 provided through the input 11 is one in the (n+1) field. The V signal 101 is delayed by 262 lines (one field) at the 262H delay circuit 14 and further delayed by one line at the 1H delay circuit 15 from which a n-field signal is outputted. This n-field signal is delayed by 262 lines at the 262H delay circuit 17 and is further delayed by one line at the 1H delay circuit 18 from which a (n−1) field signal is outputted.

The n-field V signal, which is the output signal of the 1H delay circuit 15, is further delayed by two pixels at the 2D delay circuit 20 to which a signal at the objective sample point "⊚" χ is outputted. At this point, the V signal delayed by two pixels at the 2D delay circuit 21 is a signal at the (n−1) field sample point "● ". These signals are then subjected to subtraction at the subtracter 25 to provide a difference between the objective sample point χ and the sample point e. This difference is passed through the LPF 26 whereat C signals for the first YC separation in three fields are removed to provide a higher frequency band luminance component in the vertical (v) and the time axis (f) directions, which is a part of the luminance signal and is located in the second and fourth quadrant of FIG. 7C, but is a lower frequency component in the horizontal (μ) direction as illustrated by the shaded portion HFY1 and HFY2 of FIGS. 7A–C.

The V signal 101 inputted through the input 11 is subtracted from the output of the 1H delay circuit 15 at the subtracter 16 and is then delayed by one line at the 1H delay circuit 19 to provide a difference between the sample points i and k. This difference is added to the output of the subtracter 25 at the adder 24. As a result, a higher luminance frequency band component in the vertical and time axis directions located in the second and fourth quadrant in FIG. 8C, which is a part of the luminance signals and is decreasing toward the bottom right between frequency components representing the chrominance signals in FIGS. 8A, B, and C in a manner similar to that of higher frequency luminance components HFY5 and HFY6 of FIGS. 8A–C, is obtained from which C signals for the second YC separation in three fields are removed.

The output of the 1H delay circuit 19 is delayed by four pixels at the 4D delay circuit 22 to provide a difference between the sample points j and l. This difference is then added to the output of the subtracter 25 at the adder 23 to provide a higher frequency band luminance component in the vertical (v) and the time axis (f) directions, which is a part of the luminance signal and is located in the second and fourth quadrant of FIG. 9C, and is increasing toward the upper right between frequency components representing the chrominance signal as illustrated by the shaded portions HFY3 and HFY4 in FIG. 9A, B and C, from which C signals for the third YC separation in three fields are removed.

The three calculations between three fields are inputted to the signal selection circuit 39 and selected by the output of the minimum value selection circuit 38 as will be described.

The outputs of the 262H and 4D delay circuit 17, 29 are subjected to subtraction from each other at the subtracter 32, with the result being converted into an absolute value by the absolute value circuit 35, thereby detecting a correlation between the sample points g and j shown in FIGS. 5B and 5C. The outputs of the 4D and 1H delay circuits 30, 28 are subjected to subtraction from each other at the subtracter 33, with the result being converted into an absolute value by the absolute value circuit 36, thereby detecting a correlation between the sample points f and i shown in FIGS. 5B and 5C. The outputs of the 2D delay circuits 21, 31 are subjected to subtraction from each other at the subtracter 34, with the result being converted into an absolute value by the absolute value circuit 37, thereby detecting a correlation between the sample points e and h shown in FIGS. 5B and 5C.

The minimum value selecting circuit 38 selects the minimum one of the aforementioned three absolute value outputs, which is maximum in the detection of correlation. The minimum value is then used to control the signal selection circuit 39.

More particularly, the signal selection circuit 39 selects the output of the adder 23 if the output of the ABS circuit 35 is minimum; selects the output of the adder 24 if the output of the ABS circuit 36 is minimum; and selects the output of the LPF 26 if the output of the ABS circuit 37 is minimum, respectively.

Moreover, the output of the signal selection circuit 39 is added at the adder 40 to a lower frequency luminance component extending from the first quadrant to the third quadrant shown in FIG. 7C–9C, which is a part of the luminance signals and is occupying the whole band in the horizontal direction in FIGS. 7–9 as indicated by the unshaded portion LFY of FIGS. 7 and 9, which is the output of the adder 27, and multiplied by one-half multiplier 40a, thereby providing a Y signal 112 from the YC separation in three fields.

The subtracter 41 subtracts the Y signal 112 of YC separation in three fields from the V signal which is the output of the 2D delay circuit 20, so as to provide C signals 113 of YC separation in three fields.

Figure 3:
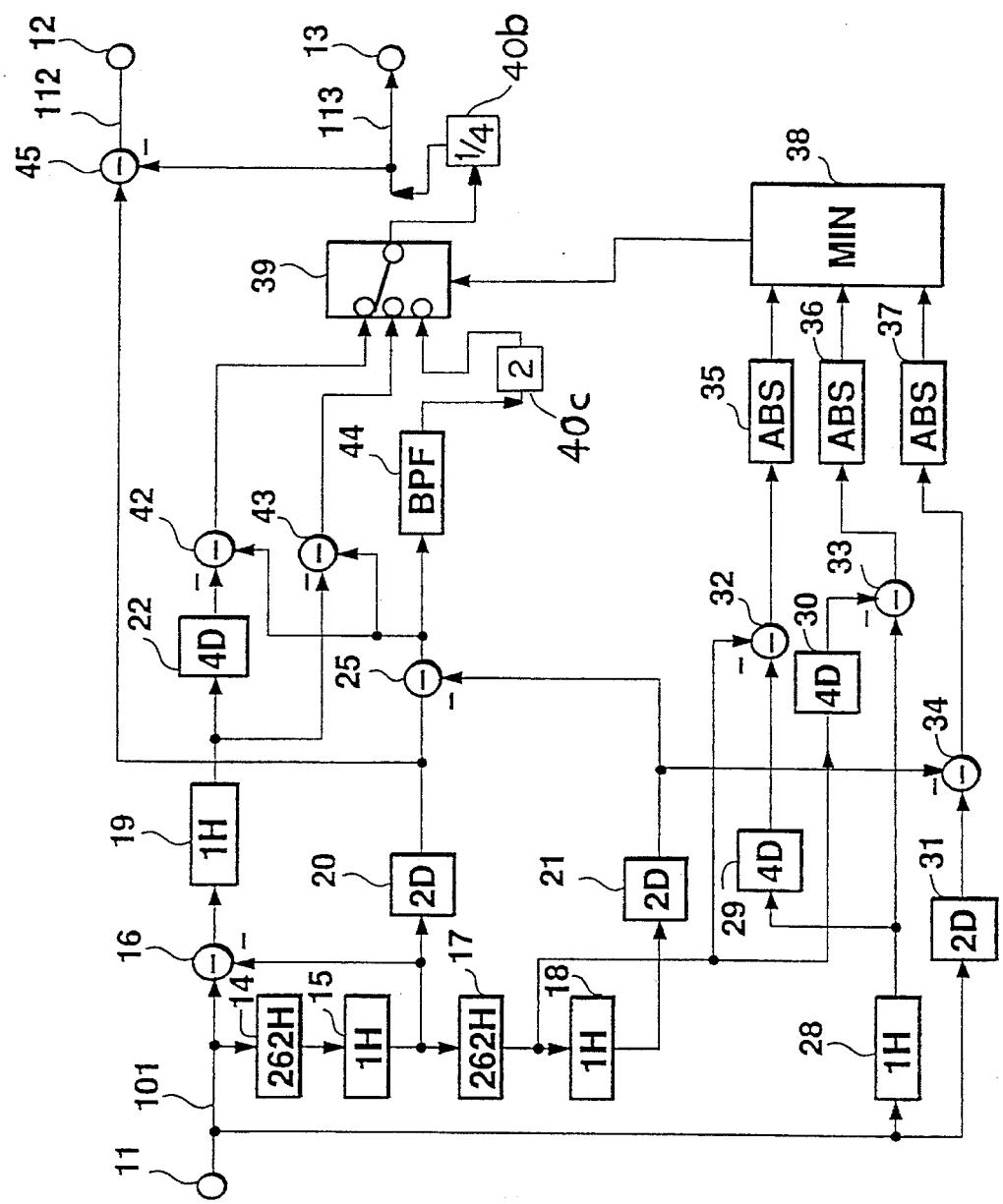
FIG. 3 is a detailed block diagram of another YC separating in three fields circuit usable in the embodiment of the present invention shown in FIG. 1.

FIG. 3 illustrates a block diagram of the second embodiment of a YC separation in three fields circuit 50 which is shown in FIG. 1 and constructed in accordance with the present invention.

Although the arrangement of FIG. 2 adaptively selects filters performing Y-signal band limitations due to three three-interfield calculations, the arrangement shown in FIG. 3 adaptively selects filters performing C-signal band limitations due to three calculations in three fields. Thus, only a part of the YC separation in three fields circuit shown in FIG. 3, which makes the C-signal band limitations different from these of FIG. 2, will be described below. In FIG. 3, parts similar to those of FIG. 2 are denoted by similar reference numerals.

The output of the subtracter 25 is passed through the BPF 44 and then pass through a multiplication by two circuit 40b to provide C signals for the YC separation in three fields.

The subtracter 43 subtracts the difference between sample points i and k, which is the output signals of the 1H delay circuit 19 from the output of the subtracter 25, to provide a difference signal which in turn provides the C signal for the second YC separation in three fields.

The subtracter 42 subtracts the difference between sample points j and l which is the output signal of the 4D delay circuit 22, from the output of the subtracter 25 to provide a difference signal which in turn provides the C signal for the third YC separation in three fields.

The output of the signal selection circuit 39 is multiplied by one-quarter multiplier 40c and is used to select C signal from any one of the three calculations in three fields to provide a C signal 113 for the YC separation in three fields.

The subtracter 45 subtracts this C signal 113 from the V signal which is the output of the 2D delay circuit 20, so as to provide a Y signal 112 for the YC separation in three fields.

Figure 4:
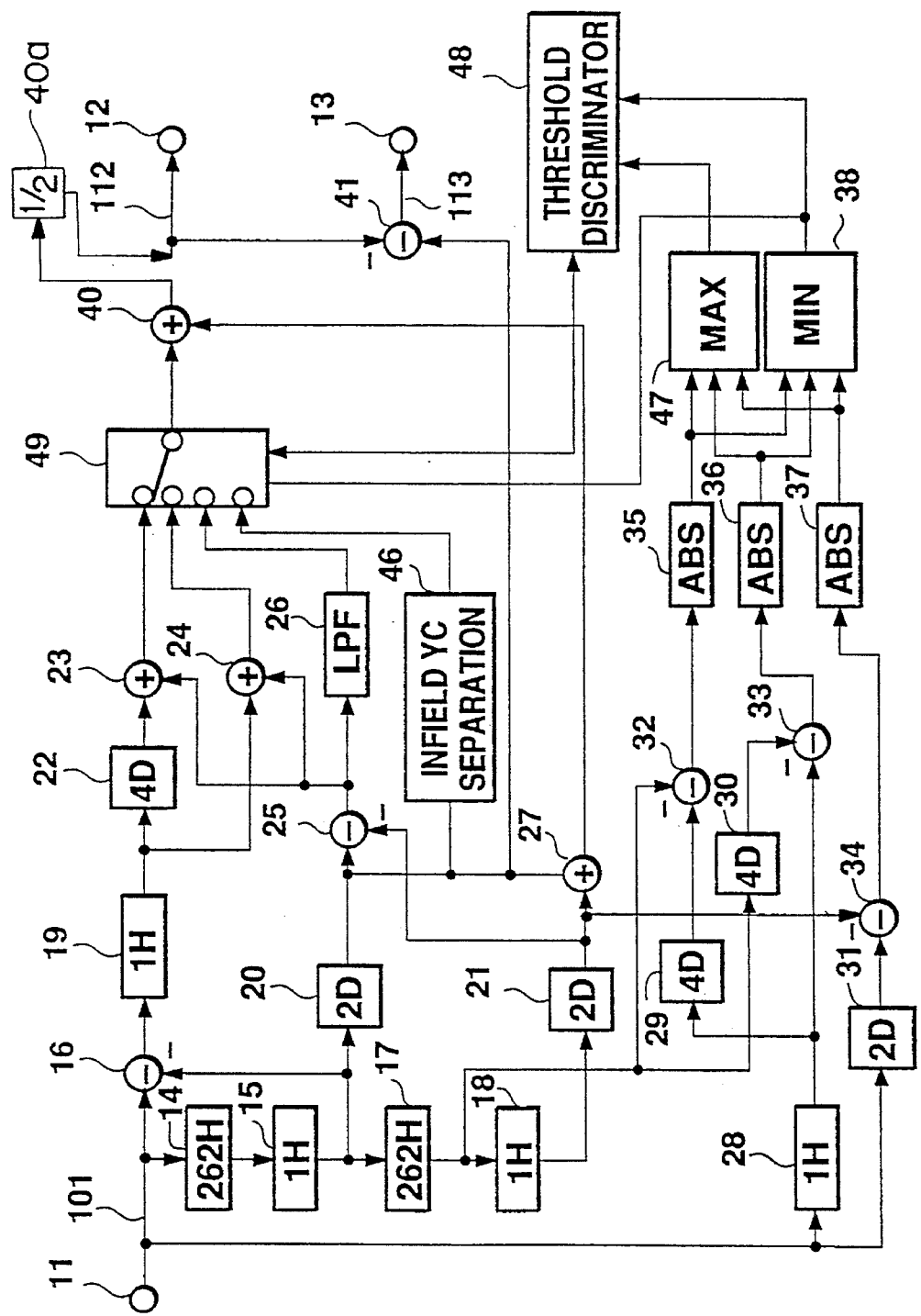
FIG. 4 is a detailed block diagram of still another YC separating in three fields circuit usable in the embodiment of the present invention shown in FIG. 1.

FIG. 4 is a block diagram of the third embodiment of the YC separation in three fields circuit 50 shown in FIG. 1.

The arrangement of FIG. 4 is distinguished from that of FIG. 2 only in that there is an infield YC separation circuit using infield calculation in addition to the YC separation in three fields circuits including three different calculations in three fields. The optimum one of the above four calculations is selected and utilized. There will only be described only an interframe correlation detecting circuit in the YC separating in three fields circuits of FIG. 4, which is different from those of FIG. 2. Parts similar to those of FIG. 2 are designated by similar reference numerals.

The output of the adder 23 is applied to the first input of the signal selection circuit 49. The output of the adder 24 is provided to the second input of the signal selection circuit 49. The output of the LPF 26 is applied to the third input of the signal selection circuit 49. The output of the 2D delay circuit 20 is provided to the first inputs of the subtracter 25, subtracter 41 and adder 27 and further applied to the infield YC separation circuit 46. The infield YC separation circuit 46 is defined only by infield calculations as in the conventional infield YC separation circuit 4 shown in FIG. 10. The output of the infield YC separation circuit 46 is applied to the fourth input of the signal selection circuit 49.

The output of the ABS circuit 35 is applied to the first inputs of the maximum and minimum value selection circuits 47 and 38, respectively. The output of the ABS circuit 36 is provided to the second inputs of the maximum and minimum value selection circuits 47 and 38, respectively. The output of the ABS circuit 37 is provided to the third inputs of the maximum and minimum value selection circuits 47 and 38, respectively. The output of the maximum value selection circuit 47 is provided to the first input of a threshold discriminating circuit 48. The output of the minimum value selection circuit 38 is provided to the second input of a threshold discriminating circuit 48 and also to the fifth input of the signal selection circuit 49. The output of the input of the signal selection circuit 49. If the maximum one of the three interframe correlations is smaller than a first threshold G or if the minimum one of the three interframe correlations is larger than a second threshold $\beta$, the threshold discriminating circuit 48 controls the signal selection circuit 49 to select the output of the infield YC separation circuit 46. On the other hand, if the maximum one of the three interframe correlations is larger than the first threshold $\alpha$ or if the minimum one of the three interframe correlations is smaller than the second threshold $\beta$, the threshold discriminating circuit 48 causes the output of the minimum value selection circuit 38 to control the signal selection circuit 49 such that the latter will select the output of the adder 23 if the output of the ABS circuit 35 is minimum; select the output of the adder 24 if the output of the ABS circuit 36 is minimum; and select the output of the LPF 26 if the output of the ABS circuit 37 is minimum. As in the embodiment of FIG. 2, this will permit the adaptive YC separation in three fields including three calculations in three fields. However, the condition of $\alpha<\beta$ must be satisfied.

As in the embodiment of FIG. 4, the embodiment of FIG. 3 can also adaptively control switching the YC separations utilizing only the infield band limitations and the three YC separations in three fields by using the infield YC separating circuit 46, value selection circuit 47, threshold discriminating circuit 48 and signal selection circuit 49.

We claim:

1. A motion adaptive luminance and color signal separating filter for separating luminance and color signals from a composite color television signal in which the frequency of the color signal is multiplexed over the high-frequency region of the luminance signal, said filter including an interfield correlation device for separating the luminance and color signals in response to interframe correlation, the interfield correlation device comprising:

(A) luminance and color signal separating means for adding and subtracting a signal indicative of an objective sample point in a first field (n-field) and a plurality of signals indicative of sample points located proximate to the objective sample point in a picture and within fields (n−1 and n+1 fields) previously and subsequently adjacent to said first field, to provide a correlation between three fields which is utilized in turn, to perform separation of the color and luminance signals;

(B) correlation detecting means for calculating a difference signal in a set of the sample points whose chrominance subcarriers are in phase between the frames and spaced away from one another by one frame, the calculated difference signal being used to detect a direction of higher correlation for a set of sample points located about said objective sample point; and (C) selection means for selecting sample points having a direction of higher correlation in said luminance and color signal separating means, based on the direction of correlation detected by said correlation detecting means, to thereby select one set of sample points in which to perform separation of the color and luminance signals using the interfield correlation device.

2. The motion adaptive luminance and color signal separating filter of claim 1, further comprising:

(A) means for detecting motion in the picture based on the interframe correlation;

(B) interframe correlation luminance and color signal separation means for separating the luminance and color signals, based on the interframe correlation; and (C) mixing means for receiving an output of said interfield correlation device if the motion detected by said motion detecting means is relatively large and for receiving an output of said interframe correlation luminance and color signal separating means if the motion detected by said motion detecting means is relatively small, whereby the luminance and color signals from said interfield correlation device and said interframe correlation luminance and color signal separating means can be mixed.

3. The motion adaptive luminance and color signal separating filter of claim 2 wherein the set of sample points used to detect the difference in said correlation detecting means are present within the n−1 and n+1 fields previously and subsequently adjacent to the n-field including the objective sample point and located with the objective sample point being in the picture therebetween.

4. The motion adaptive luminance and color signal separating filter of claim 3 wherein said luminance and color signal separating means is adapted to extract a color signal by subtracting signals for three sample points having chrominance n−1 field subcarriers which are out of phase relative to the objective sample point by 180°, signals for three sample points having chrominance n+1 field subcarriers which are out of phase relative to the objective sample point by 180° and a signal for the objective sample points.

5. The motion adaptive luminance and color signal separating filter of claim 2 wherein said correlation detecting means includes a plurality of absolute value circuits for determining the respective absolute values of a plurality of difference signals; and a minimum value selection circuit for determining the minimum absolute value of the absolute value signals output from said absolute value circuits.

6. The motion adaptive luminance and color signal separating filter of claim 2, further comprising infield luminance and color signal separating means for separating luminance and color signals using infield band limitations.

7. The motion adaptive luminance and color signal separating filter of claim 2, further comprising a plurality of subtracters for calculating difference signals; a plurality of absolute value circuits for determining respective absolute values from difference signals output from said subtracters; a minimum value selection circuit for determining the minimum value of the absolute value signals output from said absolute value circuits; a maximum value selection circuit for determining the maximum value of the absolute value signals output from said absolute value circuits; and a discriminating circuit for comparing outputs of said minimum and maximum value selection circuits with predetermined thresholds, whereby said selection means can be controlled to select said infield luminance and color signal separating means if the output of said maximum value selection circuit is smaller than a first predetermined threshold $\alpha$ or if the output of said minimum value selection circuit is larger than a second predetermined threshold $\beta$ and whereby said selection means can be controlled to select said interfield correlation device if the output of said maximum value selection circuit is larger than said first predetermined threshold $\alpha$ or if the output of said minimum value selection circuit is smaller than said second predetermined threshold $\beta$.

8. A device for producing a luminance signal from a composite color signal comprising:

separating means for separating a chrominance signal from the composite color signal by using a composite color signal from a first field, a composite color signal from a second field, and a composite color signal from a third field, the first field containing an objective point, said separating means including first means for producing a first and second signal, each first and second signal including a chrominance signal produced by using said objective point, a sample point in said second field, and a sample point in said third field; and combining means for producing said luminance signal from one of said first and second signals and said composite color signal.

9. The device as claimed in claim 8 wherein said separating means further comprises:

third means for producing a third signal including a chrominance signal produced using the composite color signal of the objective point and the composite color signal of a sample point in said second field; and selecting means for selecting of said first, second, or third signals based on which signal has a highest correlation;

said combining means subtracting the signal selected by said selecting means from said composite color signal to produce the luminance signal.

10. The device as claimed in claim 9 wherein said third means includes a band pass filter.

11. The device as claimed in claim 8 wherein said separating means mathematically sums a signal indicative of an objective sample point in a first field and one of a plurality of signals indicative of sample points located proximate to the objective sample point in a second field to provide interfield processing of the composite color signal.

12. A device for separating a luminance signal from a composite color signal comprising:

a three-field separating circuit which receives a composite color signal and separates a luminance signal from the composite color signal by processing a composite color signal from a first field, a composite color signal from a second field, and a composite color signal from a third field, said first field containing an objective point, said three-field separating circuit including, first means for producing a first and second signal, each first and second signal being a higher frequency component of the luminance signal produced by using said objective point, a sample point in said second field, and a sample point in said third field, second means for producing a third signal having a lower frequency component of luminance signal produced by Using the composite color signal at said objective point and the color composite signal at a sample point in said second field, and adding means for adding one of said first and second signals with said third signal to produce the luminance signal.

13. The device as claimed in claim 12 wherein said three-field separating circuit further comprises:

third means for producing a fourth signal being a higher frequency component of a luminance signal produced using the composite color signal of the objective point and the composite color signal of a sample point in said second field; and selecting means for selecting either said first, second, or fourth signals based on which signal has a highest correlation;

said adding means adding the signal selected by said selecting means with said third signal to produce the luminance signal.

14. The device as claimed in claim 13 wherein said three field separating circuit further comprises:

fourth means for producing a fifth signal, said fifth signal being a higher frequency component of the luminance signal produced by using an infield separation process upon the composite color signal of said first field; and selecting means for selecting either said first, second, fourth, or fifth signals;

said adding means adding the signal selected by said selecting means with said third signal to produce the luminance signal.

15. The device as claimed in claim 14 wherein said three field separating circuit further comprises:

correlation means for calculating a difference signal among the sample points in which chrominance subcarriers are in phase between frames and spaced apart from one another by one frame and for determining a direction in which sample points, located proximate to the objective sample point, has a highest correlation value and a direction which has a lowest correlation value.

16. The device as claimed in claim 15 wherein said three field separating circuit further comprises:

threshold means for determining when the lowest correlation value is below a first threshold value and the highest correlation value is above a second threshold value;

said selecting means outputting said higher frequency component of said luminance signal produced by 9 the infield separation process when said threshold means determines that the lowest correlation value is below the first threshold value and that the highest correlation value is above the second threshold value;

said selecting means outputting the one of the higher frequency component luminance signals corresponding to the highest correlation value when said threshold means does not determine that the lowest correlation value is below the first threshold value and that the highest correlation value is above the second threshold value.

17. The device as claimed in claim 13 wherein said third means includes a low pass filter.

18. The device as claimed in claim 12 further comprising:

subtracting means for subtracting the luminance signal from the composite color signal to produce a chrominance signal.

19. The device as claimed in claim 12 wherein said separating means mathematically sums a signal indicative of an objective sample point in a first field and one of a plurality of signals indicative of sample points located proximate to the objective sample point in a second field to provide interfield processing of the composite color signal.

20. A device for producing a chrominance signal from a composite color signal comprising:

separating means for generating three distinct separated chrominance signals from the composite signal, each separated chrominance signal being derived from a composite signal of a first field and a composite signal of a second field and for outputting said three distinct separated chrominance signals; and selecting means, operatively connected to said separating means, for evaluating a correlation relationship between points in different fields and for selecting either one of said three distinct separated chrominance signals in accordance with the correlation evaluation, thereby providing the chrominance signal.

21. The device as claimed in claim 20 wherein said separating means mathematically sums a signal indicative of an objective sample point in a first field and one of a plurality of signals indicative of sample points located proximate to the objective sample point in a second field to provide interfield processing of the composite color signal.

22. The device as claimed in claim 20 wherein said selecting means comprises:

correlation means for calculating a difference signal among the sample points in which chrominance subcarriers are in phase between frames and spaced apart from one another by one frame and for determining a direction in which sample points, located proximate to the objective sample point, has a highest correlation value and a direction which has a lowest correlation value.

23. A device for producing a chrominance signal from a composite color signal comprising:

an interfield separating circuit generating three distinct separated chrominance signals from the composite signal, each separated chrominance signal being derived from a composite signal of a first field and a composite signal of a second field and for outputting said three distinct separated chrominance signals; and a selecting circuit, operatively connected to said interfield separating circuit, to select one of said three distinct separated chrominance signals in accordance with a correlation evaluation.

24. The device as claimed in claim 23 wherein said interfield separating circuit mathematically sums a signal indicative of an objective sample point in a first field and one of a plurality of signals indicative of sample points located proximate to the objective sample point in a second field to provide interfield processing of the composite color signal.

25. The device as claimed in claim 23, further comprising:

a correlator to calculate a difference signal among the sample points in which chrominance subcarriers are in phase between frames and spaced apart from one another by one frame and to determine a direction in which sample points, located proximate to the objective sample point, has a highest correlation value and a direction which has a lowest correlation value.

26. A method for producing a luminance signal from a composite color signal comprising the steps of:

(a) separating a luminance signal from the composite color signal by using a composite color signal from a first field, a composite color signal from a second field, and a composite color signal from a third field by, (a1) producing a first and second signal, each first and second signal being a higher frequency component of the luminance signal produced by using the objective point, a sample point in the second field and a sample point in the third field;

(a2) producing a third signal having a lower frequency component of the luminance signal produced by using the composite color signal at the objective point and the color composite signal at a sample point in the second field; and (a3) adding one of the first and second signals with the third signal to produce the luminance signal.

27. The method as claimed in claim 26 wherein the first field represents a field containing an objective point, the second field representing a field preceding the first field in time, and the third field representing a field following the first field in time.

28. The method as claimed in claim 26 wherein said step (a) further comprises the sub-steps of:

(a4) producing a fourth signal being a higher frequency component of a luminance signal produced using the composite color signal of the objective point and the composite color signal of a sample point in the second field; and (a5) selecting either the first, second, or fourth signals based on which signal has a highest correlation;

said step (a3) adding the signal selected by said step (a5) with the third signal to produce the luminance signal.

29. The method as claimed in claim 26 wherein said step (a) mathematically sums a signal indicative of an objective sample point in a first field and one of a plurality of signals indicative of sample points located proximate to the objective sample point in a second field to provide interfield processing of the composite color signal.

30. The method as claimed in claim 26 wherein said step (a) further comprises the sub-steps of:

(a6) calculating a difference signal among the sample points in which chrominance subcarriers are in phase between frames and spaced apart from one another by one frame; and (a7) determining a direction in which sample points, located proximate to the objective sample point, has a highest correlation value and a direction which has a lowest correlation value.

31. The method as claimed in claim 30 wherein said step (a) further comprises the sub-steps of:

(a8) determining when the lowest correlation value is below a first threshold value and the highest correlation value is above a second threshold value;

(a9) outputting a higher frequency component of said luminance signal obtained by an infield YC separation process when the lowest correlation value is determined to be below the first threshold value and the highest correlation value is determined to be above the second threshold value; and (a10) outputting the higher frequency component of said luminance signal corresponding to the highest correlation value when the lowest correlation value is not determined to be below the first threshold value and the highest correlation value is not determined to be above the second threshold value.

32. The method of claim 26 further comprising:

(b) subtracting the separated luminance signal from the composite color signal, thereby producing a chrominance signal.

33. A method for producing a luminance signal from a composite color signal comprising the steps of:

(a) developing a first luminance signal from the composite color signal;

(b) generating three distinct separated higher frequency luminance signal portions from the composite signal, each said higher frequency luminance signal portion being derived from a composite signal of a first field and a composite signal of a second field;

(c) evaluating a correlation relationship between points in different fields;

(d) selecting one of the three higher frequency luminance signal portions in accordance with the correlation evaluation; and (e) combining said first luminance signal and said selected one of said higher frequency luminance signal portions to produce a more accurate luminance signal.

34. The method as claimed in claim 40 wherein said step (b) mathematically sums a signal indicative of an objective sample point in a first field and one of a plurality of signals indicative of sample points located proximate to the objective sample point in a second field to provide interfield processing of the composite color signal.

35. The method as claimed in claim 33 wherein the first field contains an objective sample point and the second field contains a sample point and wherein said step (c) comprises the sub-steps of:

(c1) calculating a difference signal among the sample points in which chrominance subcarriers are in phase between frames and spaced apart from one another by one frame; and (c2) determining a direction, in which sample points located proximate to the objective sample point, has a highest correlation value and a direction which has a lowest correlation value.

36. The method as claimed in claim 35 wherein said step (c) further comprises the sub-steps of:

(c3) determining when the lowest correlation value is below a first threshold value and the highest correlation value is above a second threshold value;

said step (d) selecting a higher frequency luminance signal portion obtained by an infield separation process when the lowest correlation value is determined to be below the first threshold value and the highest correlation value is determined to be above the second threshold value;

said step (d) selecting the higher frequency luminance signal portion corresponding to the highest correlation value when the lowest correlation value is not determined to be below the first threshold value and the highest correlation value is not determined to be above the second threshold value.

37. A method for motion adaptive separating luminance and color signals from a composite color television signal in which the frequency of the color signal is multiplexed over the high-frequency region of the luminance signal, said filter including an interfield correlation device for separating the luminance and color signals in response to interframe correlation, the interfield correlation device comprising the steps of:

(a) adding and subtracting a signal indicative of an objective sample point in a first field and a plurality of signals indicative of sample points located proximate to the objective sample point in a picture and within fields previously and subsequently adjacent to the first field, to provide a correlation between three fields which is utilized, to perform separation of the color and luminance signals;

(b) calculating a difference signal for a set of the sample points whose chrominance subcarriers are in phase between the frames and spaced away from one another by one frame, the calculated difference signal being used to detect a direction of higher correlation for a set of sample points located about the objective sample point; and (c) selecting a sample point having a direction of higher correlation based on the direction of correlation detected by said step (b), thereby selecting one of the three fields in which to perform separation of the color and luminance signals using the interfield correlation device.

38. The method as claimed in claim 37, further comprising the steps of:

(d) detecting motion in the picture based on the interframe correlation;

(e) separating the luminance and color signals, based on the interframe correlation; and (f) mixing the luminance and chrominance signals produced by said steps (c) and (e) by using a greater quantity of the interfield correlated signals if the motion detected by said step (d) means is relatively large and using a greater quantity of the interframe correlated luminance and color signal if the motion detected by said step (d) is relatively small, thereby mixing the luminance and color signals according to the motion of the image.

39. A device for producing a luminance signal from a composite color signal comprising:

first luminance signal development means for developing a first luminance signal from the composite color signal;

separating means for generating three distinct separated higher frequency luminance signal portions from the composite signal, each said higher frequency luminance signal portion being derived from a composite signal of a first field and a composite signal of a second field and for outputting said three distinct separated higher frequency luminance signal portions; and selecting means, operatively connected to said separating means, for evaluating a correlation relationship between points in different fields and for selecting one of said three higher frequency luminance signal portions in accordance with the correlation evaluation;

means, operatively connected to said first luminance signal development means and said selecting means, for combining said first luminance signal and the selected one of said higher frequency luminance signal portions, thereby producing a more accurate luminance signal.

40. The device as claimed in claim 39 wherein said separating means mathematically sums a signal indicative of an objective sample point in a first field and one of a plurality of signals indicative of sample points located proximate to the objective sample point in a second field to provide interfield processing of the composite color signal.

41. The device as claimed in claim 39 wherein the first field contains an objective point and the second and the third fields contain sample points and wherein said selecting means comprises:

correlation means for calculating a difference signal among the sample points in which chrominance subcarriers are in phase between frames and spaced apart from one another by one frame and for determining a direction in which sample points, located proximate to the objective sample point, has a highest correlation value and a direction which has a lowest correlation value.

42. The device as claimed in claim 39 wherein said selecting means comprises:

threshold means for determining when the lowest correlation value is below a first threshold value and the highest correlation value is above a second threshold value;

said separating means further using infield YC separation to generate a fourth higher frequency luminance signal portion;

said selecting means outputting the fourth higher frequency luminance signal portion obtained by infield YC separation when said threshold means determines that the lowest correlation value is below the first threshold value and that the highest correlation value is above the second threshold value;

said selecting means outputting the one of said three distinct separated higher frequency luminance signal portions corresponding to the highest correlation value when said threshold means does not determine that the lowest correlation value is below the first threshold value and that the highest correlation value is above the second threshold value.

43. A device for producing a luminance signal from a composite color signal comprising:

first luminance signal development means for developing a first luminance signal from the composite color signal;

an interfield separating circuit generating three distinct separated higher frequency luminance signal portions from the composite signal, each said higher frequency luminance signal portion being derived from a composite signal of a first field and a composite signal of a second field and for outputting said three distinct separated higher frequency luminance signal portions; and a selecting circuit, operatively connected to said interfield separating circuit, to select one of said three higher frequency luminance signal portions in accordance with a correlation evaluation; and a combining circuit, operatively connected to said first luminance signal development means and said selecting circuit, combining said first luminance signal and the selected one of said three higher frequency luminance signal portions to produce a more accurate luminance signal.

44. A method for producing a chrominance signal and a luminance signal from a composite color signal comprising the steps of:

(a) generating three distinct separated chrominance signals from the composite signal, each separated chrominance signal being derived from a composite signal of a first field and a composite signal of a second field;

(b) selecting one of the three distinct separated chrominance signals; and (c) combining said composite color signal and said selected chrominance signal to form a luminance signal.

45. The method as claimed in claim 44 wherein the first field contains an objective point, the second field precedes the first field in time, and a third field follows the first field in time.

46. The method as claimed in claims 44 wherein said step (a) mathematically sums a signal indicative of an objective sample point in a first field and one of a plurality of signals indicative of sample points located proximate to the objective sample point in a second field to provide interfield processing of the composite color signal.

* * * * *